Aug. 30, 1949.   H. K. BIGELOW   2,480,697
SHOCK-RESISTANT HAND TRUCK
Filed March 11, 1948   2 Sheets-Sheet 1
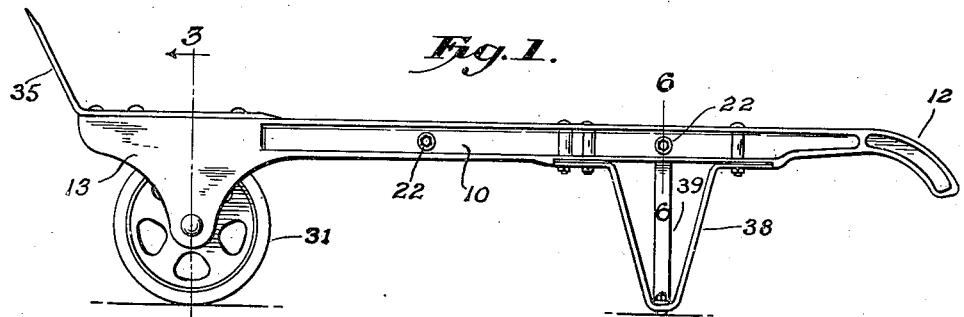
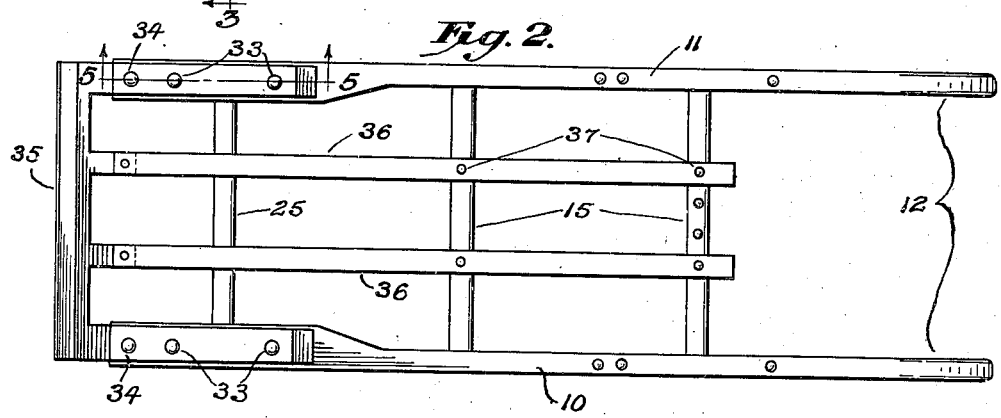
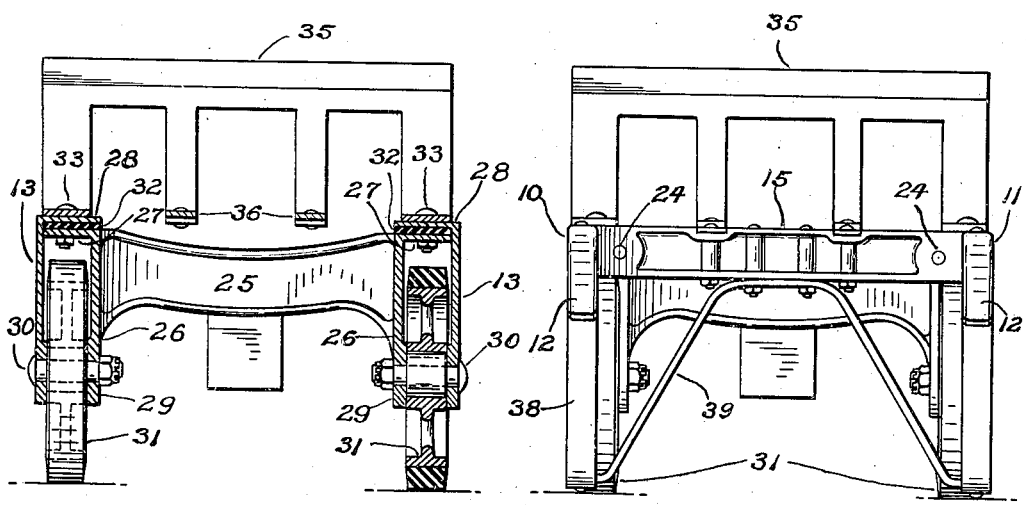
Fig. 3.   Fig. 4.
Inventor
Harry K. Bigelow
By W. V. McDowell
Attorney Aug. 30, 1949. H. K. BIGELOW 2,480,697
SHOCK-RESISTANT HAND TRUCK
Filed March 11, 1948
2 Sheets-Sheet 2

Inventor
Harry K. Bigelow
By
W. S. McDowell
Attorney

Patented Aug. 30, 1949

2,480,697

UNITED STATES PATENT OFFICE 2,480,697

SHOCK-RESISTANT HAND TRUCK

Harry K. Bigelow, Columbus, Ohio

Application March 11, 1948, Serial No. 14,307

2 Claims. (Cl. 280—56)

The present invention relates to hand-operated portable freight trucks, and has particular reference to an improved construction for freight trucks which enables the same to be formed from relatively inexpensive and readily available lightweight metals without fear of subsequent breakage due to severe and undue shock forces.

In the past, hand-operated freight trucks have generally been constructed of such materials as wood and steel, and when so constructed, presented relatively heavy and unwieldy structures which, when fully loaded with freight, were extremely difficult to handle by the average man. It has also been proposed in the prior art to form such freight trucks from lightweight materials such as aluminum, or alloys thereof, whereby the overall weight of the truck is decreased so as to permit of facile handling by a single man even when loaded. The primary objection to the latter type of freight truck formed from aluminum or similar lightweight metals, arose through the inherent inability of the aluminum to withstand relatively sharp and extreme shock forces ordinarily encountered during freight handling operations. If such trucks were suddenly dropped while carrying a load thereon, the resultant shock encountered by striking the ground would, in most instances, result in a complete fracture of one or more of the structural members of the truck, thereby making it necessary to repair or replace the fractured part.

It follows, therefore, that the primary object of this invention is to provide an improved lightweight portable freight truck which may be formed from cast aluminum parts, and which when assembled into truck formation, are so connected as to resist relatively extreme shock forces which would normally result in a complete fracture of one or more of the associated cast metallic parts.

It is another object of this invention to provide an improved freight truck construction wherein each of the integral frame and brace members are united in a manner to permit of limited relative resilient movement between the separate parts, thereby making the entire assembly a somewhat flexible unit capable of absorbing relatively severe shock forces, such as may be encountered when the freight truck is suddenly dropped while carrying a load in the neighborhood of one ton or more.

It is still another object of this invention to provide a freight truck construction which may be formed from relatively inexpensive and readily available lightweight aluminum or aluminum alloy stock by casting or molding the separate pieces, and which may be assembled independently of any machined or highly precision surfaces, thereby greatly reducing the manufacturing cost in relation to previously known freight trucks of this general character.

For a further and more complete understanding of the present invention, reference is made to the following description and the accompanying drawings wherein:

Fig. 1 is a side elevational view of a freight truck formed in accordance with the present invention;

Fig. 2 is a top plan view thereof;

Fig. 3 is a transverse vertical sectional view taken along the line 3—3 of Fig. 1;

Fig. 4 is a rear end elevational view of the present freight truck;

Figure 5:
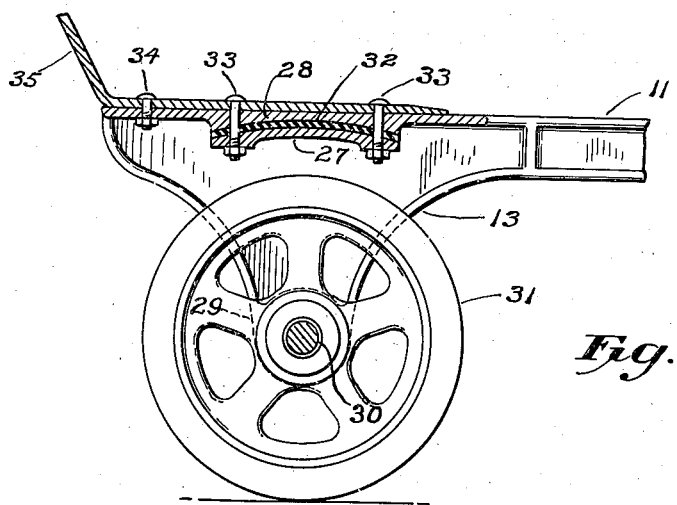
Fig. 5 is an enlarged vertical sectional view taken along the line 5—5 of Fig. 2.

With reference to the drawings, it will be seen that the present invention makes use of a pair of relatively elongated side frames 10 and 11 which, may advantageously be formed from cast aluminum or alloys thereof, and which are provided at one end with a pair of arcuate gripping handles 12, and at their opposite ends with a pair of depending outside wheel-receiving brackets 13. Preferably, both the handle members and wheel-receiving brackets are formed or cast integrally with the side frame members, and as such, present unitary structures. The intermediate portion of each of the side frames 10 and 11 are provided upon their inner side faces with a plurality of longitudinally spaced and transversely opposed sets of arcuately concave bosses 14 which provide transversely spaced arcuate contacting surfaces for the reception of the end surfaces of a plurality of transversely extending cross braces 15 which form the load-receiving bed of the freight truck.

Figure 6:
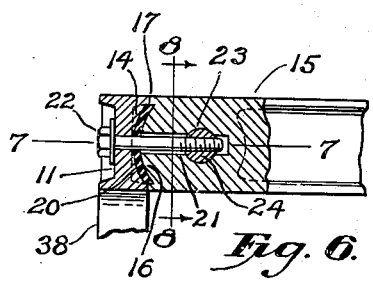
Fig. 6 is an enlarged fragmentary vertical sectional view taken along a plane indicated by the line 6—6 of Fig. 1.
Figure 7:
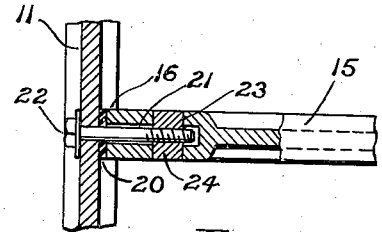
Fig. 7 is a horizontal sectional view taken along the line 7—7 of Fig. 6.
Figure 8:
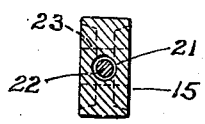
Fig. 8 is a vertical sectional view along the line 8—8 of Fig 6.
Figure 9:
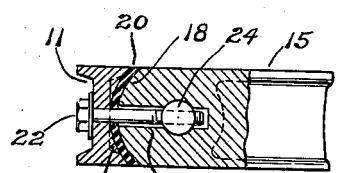
Fig. 9 is a vertical sectional view, similar to that disclosed in Fig. 6, of a slightly modified type of resilient union embodied in the present invention.

As shown particularly in Figs. 6 and 7 of the drawings, the end surfaces of each of the cross braces 15 are rounded, as at 16, to provide complemental convex surfaces with respect to the concave bosses of the side frames 10 and 11. In the primary form, as disclosed in Fig. 6, the end surfaces of the cross braces 15 are provided with an intermediate arcuate convex surface, terminating in vertical upper and lower ledges 17. To simplify this construction, and facilitate the casting of the various parts, a modification of the union between the cross braces and side frames, as shown particularly in Fig. 9 of the drawings, may be accomplished wherein the end surface 18 of each of the cross braces 15 is formed in a completely arcuate manner which is devoid of the upper and lower ledge portions, and the complemental concave bosses formed on the side frames 10 and 11, are also provided with a completely arcuate engaging surface 19.

Interposed between each of the concave bosses of the side frames and the convex end surfaces of each of the cross braces 15 is a resiliently yieldable shock pad or cushion 20 which may advantageously be formed from rubbers stock, or synthetic elastomer stock, and which functions to provide a limited degree of resilient flexibility to the union between the side frames and the cross braces of the truck, particularly with respect to a limited relative torsional movement between the two members.

In addition to being provided with the rounded convex contacting surfaces, each of the cross braces 15 are formed at their respective ends with a cylindrical channel 21 for the loose reception of an attaching bolt 22 which extends transversely through an opening formed through the side frame and associated concave boss 14. The end portions of each of the cross braces 15 are further provided with a transversely disposed bearing opening 23 which intersects the bolt receiving channel 21 substantially at the inner end thereof. Rotatably carried within the bearing opening 23 is a cylindrical trunnion pin 24 which is provided with a diametrically disposed screw threaded opening for the threaded reception of the end portion of the bolt 22. Thus it will be seen, that a rigid connection may be had between the bolt 22, the side frame 11, and the trunnion pin 24, with the associated end member of the cross brace 15 being free to move in a limited rotational plane about the trunnion pin, and relative to the concave bosses of the side frames 10 and 11. The shock pads 20 serve to resiliently hold the concave end surfaces of the cross braces 15 in substantial abutting relation to the concave bosses of the side frames, and at the same time, permit limited resilient movement between the two members about the trunnion pin 24.

Extending transversely between the depending wheel-receiving brackets 13 of the side frames 10 and 11, toward the forward end of the truck, is a single forward cross brace 25 which is formed at either end with complemental inner wheel-receiving brackets 26 which are formed toward their upper ends with perpendicular disposed and arcuately convex frame engaging webs 27 for complemental engagement and attachment with longitudinally disposed and arcuately concave bosses 28 formed on the side frames 10 and 11 above the depending side brackets 13. The depending wheel-receiving side brackets 13, formed on each of the frame members 10 and 11, define with the complemental inner brackets 26 of the forward cross brace 25 a pair of wheel-receiving recesses. Each of the brackets 13 and 26 are provided toward their lower ends with bearing-receiving bosses 29 for the reception of a pair of transversely disposed axle bearings 30 upon which are rotatably supported a pair of rubber-tired ground wheels 31.

Interposed between the arcuately concave bosses 28 and the convex frame attaching webs 27 of the forward cross brace are a pair of resiliently yieldable shock pads 32 which provide a limited flexible union between the forward portion of the side frame and the forward cross brace 25. The respective mating members are united by means of nuts and bolts, as at 33, passing downwardly through the bosses 28, the shock pads 32, and the frame engaging brackets 27.

Carried upon the upper surfaces of the forward ends of the frame members 10 and 11, and rigidly united thereto, as by fastening devices 34, is a forwardly projecting and angularly inclined freight-supporting blade 35 which functions as a support for the truck when upended in a substantially vertical or diagonally vertical plane, and which further provides a forwardly projecting freight scoop or wedge adapted for insertion beneath freight when initially introducing the same upon the bed of the truck. Connected with the intermediate portion of the blade 35 are a pair of longitudinally extending bed-forming rails 36 which extend rearwardly of the truck and terminate slightly beyond the rearward cross brace 15. If desired, the rails 36 may be fastened, as at 37, to the cross braces 15 to additionally provide a rigid and unyielding bed for the freight truck.

Secured to each of the side frames 10 and 11, at either end of the rearward cross brace 15, are a pair of depending V-shaped bracket rests 38 which provide ground supports for the rear portion of the truck when the same occupies a substantially horizontal position, as shown in Fig. 1 of the drawing. In addition to the depending brackets 38, a cross brace 39 is provided which is attached at its respective ends to the apex of the brackets 38, and at its intermediate portion to the underside of the rearward cross brace 15. In this manner, the cross brace 39 imparts additional rigidity to the bracket rests 38, and additionally insures a rigid connection between such rests and the truck frame.

As indicated throughout in the drawings, the various side frames and cross braces are formed to provide a general I-shaped cross sectional configuration, with the exception of the various bosses and attaching regions which may be formed with built-up portions providing the necessary channels or sockets for the complemental attaching members. Such a construction readily lends itself to the lightweight characteristics of the truck, and provides for adidtional structural strength throughout the truck assembly.

While the cross braces 15, have been indicated throughout the drawing as extending in a straight line between the side frames 10 and 11, it will be manifest that the intermediate portions of such cross braces may be formed so as to present a shallow and arcuate bed surface of the type common to many present day freight trucks utilized in transporting relatively round objects such as barrels and the like.

In view of the foregoing, it will be seen that the present invention provides an improved lightweight and mechanically efficient freight truck construction which is characterized by its limited flexibility between connecting parts, and its consequent ability to absorb relatively sharp and undue shock forces of the type likely to be encountered during freight transporting operations.

Further, the present construction lends itself to economy of manufacture in that, the various structural components of the freight truck may be formed from inexpensive cast aluminum, or alloys thereof, eliminating any machining of the various connecting surfaces, and thereby greatly reducing labor and material costs in the manufacture of the truck.

While a present preferred embodiment of this invention has been disclosed in detail, it will be manifest that various modifications as to constructional details may be accomplished without departing from the spirit of the invention or the scope of the following claims.

I claim:

1. In a hand-operated freight truck, a pair of elongated spaced parallel side frames formed at one end with handle grips and at their opposite ends with depending wheel-supporting brackets, each of said side frames being formed at intermediate intervals with a plurality of transversely opposed and arcuately concaved bosses, a plurality of cross braces extending between said side frames for connection with the concave bosses thereof, said cross braces providing a freight-receiving bed for said truck, said cross braces being formed at either end with arcuately convex surfaces for complemental engagement with the concave bosses of said side frames, resilient shock pads interposed between the convex surfaces of said cross braces and the concave bosses of said side frames, and fastening means joining the respective ends of said cross braces with the bosses of said side frames and permitting of limited resilient movement therebetween, said fastening means including bolts extending transversely through each of said side frames and the bosses thereof and loosely into the end portions of each of said cross braces, and trunnion pins extending transversely through the end portions of each of said cross braces and joined with the ends of said bolts.

2. A shock-resistant hand-operated freight truck comprising a pair of spaced parallel side frames formed at one of their ends with handle grips and at their opposite ends with depending wheel-receiving brackets and intermediately with longitudinally spaced sets of transversely opposed concave bosses, a pair of ground wheels rotatably carried by the depending brackets of said side frames, a cross brace extending transversely between each set of concave bosses for connection with said side frames, said cross braces being formed with convex end surfaces for complemental engagement with the concave bosses of said side frames, a trunnion pin extending transversely through the end portions of each of said cross braces a distance from the convex end surfaces thereof, a resilient shock pad interposed between the convex end surfaces of each cross brace and the complemental concave bosses of said side frames, and a fastening bolt extending transversely through each of said side frames at the bosses thereof and loosely into the end portions of each cross brace for connection with the trunnion pin extending therethrough, said fastening bolts and trunnion pins providing for limited resilient movement between said side frames and said cross braces.

HARRY K. BIGELOW.

REFERENCES CITED

The following references are of record in the file of this patent:

UNITED STATES PATENTS

| Number | Name | Date |
| --- | --- | --- |
| 1,738,532 | Harbour | Dec. 10, 1929 |
| 2,301,593 | Ulrich | Nov. 10, 1942 |

FOREIGN PATENTS

| Number | Country | Date |
| --- | --- | --- |
| 13,916 | Great Britain | May 18, 1895 |